US010023683B2

(12) United States Patent
Bender et al.

(10) Patent No.: US 10,023,683 B2
(45) Date of Patent: Jul. 17, 2018

(54) CATALYST COMPOSITIONS FOR IMPROVING POLYURETHANE FOAM PERFORMANCE

(75) Inventors: Jared Denis Bender, Coplay, PA (US); Mark Leo Listemann, Kutztown, PA (US); James Douglas Tobias, Center Valley, PA (US)

(73) Assignee: Evonik Degussa GmbH, Essen (DE)

( * ) Notice: Subject to any disclaimer, the term of this patent is extended or adjusted under 35 U.S.C. 154(b) by 555 days.

(21) Appl. No.: 11/451,176

(22) Filed: Jun. 12, 2006

(65) Prior Publication Data

US 2007/0287761 A1 Dec. 13, 2007

(51) Int. Cl.

| C08G 18/40 | (2006.01) |
| C08G 18/48 | (2006.01) |
| C08G 18/18 | (2006.01) |
| C08G 18/20 | (2006.01) |
| C08G 18/76 | (2006.01) |
| C08G 101/00 | (2006.01) |

(52) U.S. Cl.
CPC ....... *C08G 18/409* (2013.01); *C08G 18/1825* (2013.01); *C08G 18/1833* (2013.01); *C08G 18/2063* (2013.01); *C08G 18/4804* (2013.01); *C08G 18/4841* (2013.01); *C08G 18/7621* (2013.01); *C08G 18/7657* (2013.01); *C08G 2101/005* (2013.01); *C08G 2101/0008* (2013.01); *C08G 2101/0058* (2013.01); *C08G 2101/0083* (2013.01)

(58) Field of Classification Search
CPC ...................................................... C08G 18/65
USPC ...................................................... 521/170
See application file for complete search history.

(56) References Cited

U.S. PATENT DOCUMENTS

| 3,836,488 | A |   | 9/1974  | Pruitt et al. |         |
| 4,143,003 | A |   | 3/1979  | Haas et al. |         |
| 4,338,408 | A |   | 7/1982  | Zimmerman et al. |    |
| 4,379,757 | A | * | 4/1983  | Baskent et al. | 502/167 |
| 4,644,017 | A |   | 2/1987  | Haas et al. |         |
| 4,772,639 | A |   | 9/1988  | Pilger et al. |       |
| 4,889,908 | A | * | 12/1989 | Franke et al. | 521/115 |
| 5,039,713 | A |   | 8/1991  | Petrella |           |
| 5,143,944 | A |   | 9/1992  | Savoca et al. |       |
| 5,233,039 | A |   | 8/1993  | Listemann |          |
| 5,274,114 | A |   | 12/1993 | Weider et al. |       |
| 5,502,147 | A | * | 3/1996  | Nodelman et al. | 528/49 |
| 5,508,314 | A |   | 4/1996  | Listemann et al. |    |
| 5,512,603 | A |   | 4/1996  | Carr et al. |         |
| 5,539,007 | A |   | 7/1996  | Listemann et al. |    |
| 5,559,161 | A |   | 9/1996  | Klotz et al. |        |
| 5,591,781 | A | * | 1/1997  | Yoshimura et al. | 521/129 |
| 5,756,557 | A |   | 5/1998  | Kimock et al. |       |
| 5,770,674 | A |   | 6/1998  | Cageao et al. |       |
| 5,824,711 | A |   | 10/1998 | Kimock et al. |       |
| 5,859,079 | A |   | 1/1999  | Mercando et al. |     |
| 5,874,483 | A |   | 2/1999  | Savoca et al. |       |
| 5,874,485 | A | * | 2/1999  | Milliren et al. | 521/160 |
| 6,114,403 | A |   | 9/2000  | Mercando et al. |     |
| 6,201,033 | B1 |  | 3/2001  | Mercando et al. |     |
| 6,232,356 | B1 |  | 5/2001  | Mercando et al. |     |
| 6,391,935 | B1 | * | 5/2002 | Hager et al. | 521/170 |
| 6,506,810 | B2 |  | 1/2003  | Borgogelli et al. |   |
| 6,780,895 | B2 |  | 8/2004  | Holechovsky et al. |  |
| 6,872,758 | B2 |  | 3/2005  | Simpson et al. |      |
| 2005/0210595 | A1 | * | 9/2005 | Di Stasio et al. | 5/740 |
| 2011/0263741 | A1 | * | 10/2011 | Tu | 521/156 |
| 2012/0277338 | A1 | * | 11/2012 | Kaplan et al. | 521/157 |

FOREIGN PATENT DOCUMENTS

| CA | 2219693     | 4/1999  |
| EP | 0361334 A2  | 4/1990  |
| EP | 0 949 285 A1 | 10/1999 |
| EP | 0499873 B1  | 11/2000 |
| EP | 1 600 465 A | 11/2005 |
| JP | 11322891 A2 | 11/1999 |
| JP | 2005336495 A2 | 12/2005 |
| WO | WO 00/55232 | 9/2000  |

OTHER PUBLICATIONS

M. L. Listemann et al., "Amine Catalyst Characterization by a Foam Model Reaction," Journal of Cellular Plastics, vol. 28 (4), Jul. 1992, pp. 360-398.

Herrington et al., "Flexible Polyurethane Foams," The Dow Chemical Company, 1997, pp. 9.22-23; 9.29 and 11.6.

\* cited by examiner

*Primary Examiner* — Melissa A Rioja
(74) *Attorney, Agent, or Firm* — Andrew H. Chung; Linda S. Li; Jason S. Ngui

(57) ABSTRACT

The present invention provides a reactive catalyst composition for making a water blown flexible polyurethane foam. The catalyst composition comprises one or more tertiary amine catalysts in combination with (1) 2-methyl-1,3-propanediol or (2) a blend of 2-methyl-1,3-propanediol and a C7+ alkanol. The use of such catalyst composition improves the physical properties of the polyurethane foam.

26 Claims, No Drawings

CATALYST COMPOSITIONS FOR IMPROVING POLYURETHANE FOAM PERFORMANCE

BACKGROUND OF THE INVENTION

Polyurethane foams are widely known and used in automotive, housing and other industries. Such foams are produced by reaction of a polyisocyanate with a polyol in the presence of various additives. One such additive is a chlorofluorocarbon (CFC) blowing agent which vaporizes as a result of the reaction exotherm, causing the polymerizing mass to form a foam. The discovery that CFCs deplete ozone in the stratosphere has resulted in mandates diminishing CFC use. Production of water-blown foams, in which blowing is performed with CO2 generated by the reaction of water with the polyisocyanate, has therefore become increasingly important. Tertiary amine catalysts are typically used to accelerate blowing (reaction of water with isocyanate to generate CO2) and gelling (reaction of polyol with isocyanate).

The ability of the tertiary amine catalyst to selectively promote either blowing or gelling is an important consideration in selecting a catalyst for the production of a particular polyurethane foam. If a catalyst promotes the blowing reaction to a too high degree, much of the CO2 will be evolved before sufficient reaction of isocyanate with polyol has occurred, and the CO2 will bubble out of the formulation, resulting in collapse of the foam. A foam of poor quality will be produced. In contrast, if a catalyst too strongly promotes the gelling reaction, a substantial portion of the CO2 will be evolved after a significant degree of polymerization has occurred. Again, a poor quality foam, this time characterized by high density, broken or poorly defined cells, or other undesirable features, will be produced.

Tertiary amines also influence other foam physical properties including air flow, hardness, tensile, tear, compression set and load loss, as well as changes to those physical properties in response to humid ageing. There remains a need in the industry for additives allowing the systematic variation of specific physical properties. Tertiary amine compositions frequently contain diluents, particularly diols such as ethylene glycol, butanediol and dipropylene glycol. The diols serve to dissolve solid tertiary amines and adjust composition viscosity for convenient handling. The diols are not thought to contribute significantly to foam physical properties at typical use levels. Mono-alcohols are not typically used as diluents since mono-functional reactants are chain terminators. Chain termination weakens the polymer network and degrades physical properties.

U.S. Pat. No. 5,770,674 discloses a RIM method for making gaskets from a specific polyurethane/urea composition that includes a low molecular weight chain extender selected from the group consisting of polyols, primary amines, secondary amines, amino alcohols and their mixtures and shows 2-methyl-1,3-propanediol.

U.S. Pat. No. 6,506,810 discloses the use of mixtures of branched alcohols including 2-ethyl-1-hexanol and organo-functionally modified polysiloxanes in the production of flexible polyurethane foams.

U.S. Pat. No. 6,780,895 discloses components of a polyurethane carpet backing and tuft bind adhesive requiring low or ultra low unsaturation polyoxypropylene polyols and 2-methyl-1,3-propanediol as a chain extender.

U.S. Pat. No. 6,872,758 discloses the optional use of 2-methyl-1,3-propanediol as a chain extender in thermoformable polyurethane foam with excellent low temperature compression set resistance.

WO 00/55232 discloses the optional use of chain extenders including dipropylene glycol and 2-methyl-1,3-propanediol as ingredients in foam compositions designed to improve ease of removal from molds.

SUMMARY OF THE INVENTION

In one embodiment the present invention provides a method for making a water blown flexible polyurethane foam of 16 kg/m$^3$ to 65 kg/m$^3$ density comprising contacting a polyisocyanate, a polyol, water as the blowing agent and optionally cell stabilizers in the presence of both a catalyst composition comprising one or more tertiary amine catalysts and a 2-methyl-1,3-propanediol (MPD) component. In one other aspect of the method the catalyst composition comprises one or more tertiary amine catalysts in combination with a 2-methyl-1,3-propanediol (MPD) component. In another aspect the 2-methyl-1,3-propanediol (MPD) component comprises MPD and in yet another aspect the MPD component comprises a blend of 2-methyl-1,3-propanediol (MPD) and an alkanol containing seven or more carbon atoms or a polyalkoxylated derivative of such alkanol.

As another embodiment of the invention there is provided a catalyst composition for making water blown flexible polyurethane foam of 16 kg/m$^3$ to 65 kg/m$^3$ density, the catalyst composition comprising one or more tertiary amine catalysts and a MPD component. In another aspect the catalyst composition comprises one or more tertiary amine catalysts and a MPD component comprising MPD and optionally a C7+alkanol or polyalkoxylated derivative thereof.

The use of such catalyst compositions improves the physical properties of the polyurethane foam, specifically by lowering the force to crush, increasing air flow and improving tear strength without significantly reducing resiliency. This minimizes foam shrinkage, resulting in lower scrap and repair rates, and improves overall foam durability.

DETAILED DESCRIPTION OF THE INVENTION

The catalyst compositions according to the invention catalyze the reaction between an isocyanate functionality and an active hydrogen-containing compound, i.e. an alcohol, a polyol, an amine or water, especially the urethane (gelling) reaction of polyol hydroxyls with isocyanate to make polyurethanes and the blowing reaction of water with isocyanate to release carbon dioxide for making foamed polyurethanes.

The flexible polyurethane foam products, slab, molded and microcellular, are prepared using any suitable organic polyisocyanates well known in the art including, for example, hexamethylene diisocyanate, phenylene diisocyanate, toluene diisocyanate ("TDI") and 4,4'-diphenylmethane diisocyanate ("MDI"). Especially suitable are the 2,4- and 2,6-TDI's individually or together as their commercially available mixtures. Other suitable isocyanates are mixtures of diisocyanates known commercially as "crude MDI", marketed as PAPI by Dow Chemical, which contain about 60% of 4,4'-diphenylmethane diisocyanate along with other isomeric and analogous higher polyisocyanates. Also suitable are "prepolymers" of these polyisocyanates comprising a partially prereacted mixture of a polyisocyanate and a polyether or polyester polyol.

Illustrative of suitable polyols as a component of the polyurethane composition are the polyalkylene ether and polyester polyols. The polyalkylene ether polyols include the poly(alkylene oxide) polymers such as poly(ethylene oxide) and poly(propylene oxide) polymers and copolymers with terminal hydroxyl groups derived from polyhydric compounds, including diols and triols; for example, among others, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane and like low molecular weight polyols.

In the practice of this invention, a single high molecular weight polyether polyol may be used. Also, mixtures of high molecular weight polyether polyols such as mixtures of di- and trifunctional materials and/or different molecular weight or different chemical composition materials may be used.

Useful polyester polyols include those produced by reacting a dicarboxylic acid with an excess of a diol, for example, adipic acid, phthalic acid or phthalic anhydride with ethylene glycol or butanediol, or reacting a lactone with an excess of a diol such as caprolactone with propylene glycol.

In addition to the polyether and polyester polyols, the masterbatches, or premix compositions, frequently contain a polymer polyol. Polymer polyols are used in polyurethane foam to increase the foam's resistance to deformation, i.e. to increase the load-bearing properties of the foam. Currently, two different types of polymer polyols are used to achieve load-bearing improvement. The first type, described as a graft polyol, consists of a triol in which vinyl monomers are graft copolymerized. Styrene and acrylonitrile are the usual monomers of choice. The second type, a polyurea modified polyol, is a polyol containing a polyurea dispersion formed by the reaction of a diamine and TDI. Since TDI is used in excess, some of the TDI may react with both the polyol and polyurea. This second type of polymer polyol has a variant called PIPA polyol which is formed by the in-situ polymerization of TDI and alkanolamine in the polyol. Depending on the load-bearing requirements, polymer polyols may comprise 20-80% of the polyol portion of the masterbatch.

Other typical agents found in the water blown polyurethane foam formulations include chain extenders such as ethylene glycol and butanediol; crosslinkers such as diethanolamine, diisopropanolamine, triethanolamine and tripropanolamine; auxiliary blowing agents such CFCs, HCFCs, HFCs, pentane, and the like; and cell stabilizers such as silicones.

A general polyurethane flexible foam formulation having a 1-4 lb/ft$^3$ (16-65 kg/m$^3$) density (e.g., automotive seating) containing a catalyst composition according to the invention would comprise the following components in parts by weight (pbw):

| Flexible Foam Formulation | pbw |
| --- | --- |
| Polyol | 20-100 |
| Polymer Polyol | 80-0 |
| Silicone Surfactant | 0.3-3.0 |
| Blowing Agent (water) | 1-6 |
| Crosslinker | 0-3 |
| Catalyst Composition | 0.2-2 |
| Isocyanate Index | 70-115 |

The amount of polyisocyanate used in polyurethane formulations according to the invention is not limited, but it will typically be within those ranges known to those of skill in the art. An exemplary range is given in the above table, indicated by reference to "NCO Index" (isocyanate index). As is known in the art, the NCO index is defined as the number of equivalents of isocyanate, divided by the total number of equivalents of active hydrogen, multiplied by 100. The NCO index is represented by the following formula.

NCO index=[NCO/(OH+NH)]X100

The method for making a water blown flexible polyurethane foam of 16 kg/m$^3$ to 65 kg/m$^3$ density comprises contacting a polyisocyanate, a polyol, water as the blowing agent and optionally cell stabilizers in the presence of both a catalyst composition comprising one or more tertiary amine catalysts and a 2-methyl-1,3-propanediol (MPD) component. In one aspect of the method, the catalyst composition comprises one or more tertiary amine catalysts in combination with a 2-methyl-1,3-propanediol (MPD) component. In another aspect the 2-methyl-1,3-propanediol (MPD) component comprises MPD and in yet another aspect the MPD component comprises a blend of 2-methyl-1,3-propanediol (MPD) and an alkanol containing seven or more carbon atoms or a polyalkoxylated derivative thereof.

The catalyst composition comprises at least one tertiary amine urethane catalyst in combination with either MPD or a blend of MPD and an alkanol containing atleast 7 carbon atoms, desirably a linear or branched C7-C26 alkanol, including polyoxyalkylene monools prepared by reaction of alkylene oxides (especially ethylene oxide and/or propylene oxide) in the presence of C7-C26 monool initiators. The preferred linear alkanols fall within the C8-C14 range, including octanol through tetradecanol, the preferred polyoxyalkylene alkanols are Tomadol 23-1 (C12-C13 centered alkanol cut alkoxylated with an average of 1 mole of ethylene oxide per mole of alkanol) and Tomadol 91-2.5 (C9-C11 centered alkanol cut alkoxylated with an average of 2.7 moles of ethylene oxide per mole of alkanol). The preferred branched alkanols are 2-ethylhexanol and isostearyl alcohol.

In addition to the MPD component, the catalyst composition may also contain diluents that are typically used for delivering urethane catalysts to the polyurethane reaction mixture, such dipropylene glycol (DPG), ethylene glycol (EG) and diethylene glycol (DEG).

Tertiary amine catalysts can be classified as gelling or blowing. Any gelling or blowing catalyst known in the art may be used according to the invention. For the purposes of this invention a gelling catalyst is any tertiary amine urethane catalyst known in the urethane art with an initial selectivity of less than 0.7, while a blowing catalyst has an initial selectivity equal to or greater than 0.7. Catalyst selectivity is defined as the ratio of the rate of blowing (urea formation) to the rate of gelling (urethane formation) [J. Cellular Plastics, Vol. 28, 1992, pp. 360-398].

Examples of suitable tertiary amine gelling catalysts include but are not restricted to diazabicyclooctane (triethylenediamine), supplied commercially in dipropylene glycol as DABCO 33-LV® catalyst by Air Products and Chemicals, Inc., 1,8-diaza-bicyclo(5.4.0)undecene-7, quinuclidine and substituted quinuclidines (U.S. Pat. Nos. 5,143,944 and 5,233,039), substituted pyrrolizidines (U.S. Pat. No. 5,512,603), and substituted pyrrolidines (EP 499 873), pentamethyldipropylenetriamine, tris(3-dimethylaminopropyl)-amine, dimethylcyclohexylamine, methyldicyclohexylamine, N,N-dimethylethanolamine, N-alkyl morpholines, dimethylaminopropylamine (DMAPA), N, N, N'', N''-tetramethyl-dipropylenetriamine, N,N-bis-(3-dimethylaminopropyl)-N-isopropanolamine, N-(3-dimethylaminopropyl)-N,N-diisopropanolamine, 2-(2-dimethylaminoethoxy)ethanol, 2-[N-(dimethylaminoethyl)-N-methylamino]ethanol, trimethylamine, triethylamine, tributylamine, trioctylamine, diethyl cyclohexylamine, N-methylmorpholine, N-ethylmorpholine, N-octadecylmorpholine (N-cocomorpholine), N-methyl-diethanolamine, N, N-dimethylethanolamine, N, N'-bis(2-hydroxypropyl)piperazine, N, N, N', N'-tetramethylethylenediamine, N, N, N', N'-tetramethyl-1,3-propanediamine, 1,4-bis(2-hydroxypropyl)-2-methylpiperazine, N, N-dimethylbenzylamine, N, N-diethylbenzylamine, N-ethyl-hexamethyleneamine, N-ethylpiperidine, alpha-methyl-benzyldimethylamine, dimethylhexadecylamine, dimethylcetylamine, and the like.

Examples of suitable tertiary amine blowing catalysts include but are not restricted to bisdimethylaminoethyl ether, commercially supplied as DABCO® BL-11 catalyst by Air Products and Chemicals, Inc., pentamethyldiethylenetriamine and related compositions (U.S. Pat. Nos. 5,039,713, 5,559,161), higher permethylated polyamines (U.S. Pat. No. 4,143,003), branched polyamines (U.S. U.S. Pat. No. 3,836,488), 2-[N-dimethylaminoethoxyethyl)-N-methylamino]ethanol and related structures (U.S. Pat. No. 4,338,408), alkoxylated polyamines (U.S. Pat. No. 5,508,314), imidazole-boron compositions (U.S. Pat. No. 5,539,007), and aminopropyl-bis(aminoethyl)ether compositions (U.S. Pat. Nos. 5,874,483 5,824,711).

Tertiary amine urea catalysts can be used as both blowing and gelling catalysts (U.S. Pat. Nos. 6,232,356; 6,201,033; 6,114,403; 5,859,079; 5,756,557). Illustrative of suitable mono-ureas and bis-ureas are 2-dimethylaminoethyl urea; N,N'-bis(2-dimethylaminoethyl) urea; N,N-bis(2-dimethylaminoethyl) urea; 3-dimethyl-aminopropyl urea; N,N'-bis(3-dimethylaminopropyl) urea; N,N-bis(3-dimethylamino-propyl) urea; 1-(N-methyl-3-pyrrolidino)methyl urea; 1,3-bis(N-methyl-3-pyrrolidino)-methyl urea; 3-piperidinopropyl urea; N,N'-bis(3-piperidinopropyl) urea; 2-piperidinoethyl urea; and N,N'-bis(2-piperidinoethyl) urea. U.S. Pat. No. 4,644,017 teaches amino alkyl ureas useful in the practice of the present invention and is hereby incorporated by reference.

The preferred ureas are 3-dimethylaminopropyl urea, N,N'-bis(3-dimethylamino-propyl) urea, 1-(N-methyl-3-pyrrolidino)methyl urea, 1,3-bis(N-methyl-3-pyrrolidino)-methyl urea, a mixture of 3-dimethylaminopropyl urea and N,N'-bis(3-dimethylamino-propyl) urea, and a mixture of 1-(N-methyl-3-pyrrolidino)methyl urea and 1,3-bis(N-methyl-3-pyrrolidino)methyl urea, the mixtures preferably being in a 75:25 to 95:5 molar ratio of mono-urea to bis-urea.

In one embodiment of the invention, some or all of the gelling, blowing, and trimerization catalyst may be "blocked" with (i.e. a salt formed with) a carboxylic acid, a phenol, or a substituted phenol, assuming that the catalyst contains amine functionality with which to form a salt. It is preferred that the "blocked" catalysts be "acid blocked". It should be noted that the catalyst as added to a polyurethane formulation may contain the carboxylic acid or phenol already present, or the acid or phenol may be added with one or more of the other ingredients in the formulation, thereby forming the salt in situ. By providing the catalyst composition in the form of such a salt, a delayed onset of catalyst activity may be achieved. This may be beneficial in some applications, for example where a delay in viscosity increase is desired in order to facilitate mold filling.

Many carboxylic acids are suitable for blocking any or all of the gelling, blowing, and trimerization catalyst components according to the invention. Nonlimiting examples include formic acid, acetic acid, propionic acid, 2-ethylhexanoic acid, aryloxy-substituted carboxylic acids such as phenoxyacetic acid and (dichlorophenoxy)acetic acid, and halogenated acids such as 2-chloropropionic acid and a ring-halogenated aromatic carboxylic acids such as chlorobenzoic acid. Further nonlimiting examples of suitable acids include hydroxy acids such as gluconic acid, hydroxyacetic acid, tartaric acid, and citric acid. It will be understood by those of ordinary skill in the art that certain acids in combination with certain gelling/blowing catalyst combinations, as a part of certain overall compositions of the polyurethane formulation, may detract from some performance properties of the overall composition and process, for example relating to the emission of volatile organic compounds (VOC's) during and/or after forming the polyurethane. The determination of acceptable combinations of acids with catalysts for a given application may therefore require some amount of routine experimentation, such as is within the ability of the skilled artisan, with such combinations still falling within the scope of the invention.

Any of a number of phenols may be used for forming salts with any or all of the gelling, blowing, and trimerization catalyst components. Suitable nonlimiting examples include nonylphenol, isopropylphenol, octylphenol, and tert-butylphenol. Also useful are dialkylphenols, for example diisopropylphenol and di-tert-butylphenol. Typically, phenol itself is used.

The catalyst composition comprises 10 to 90 wt % one or more tertiary amine catalysts, such as the gelling, blowing or urea catalysts, at and 90 to 10 wt % MPD component which may comprise MPD itself or a blend of MPD and an alcohol. Desirably the catalyst composition comprises tertiary amine catalyst and sufficient MPD component to achieve a viscosity of 100-2000 mPa (cps), and in one especially desired embodiment 25 to 80 wt % tertiary amine catalyst and 75 to 20 wt % MPDcomponent when the tertiary amine catalyst is a solid or liquid with viscosity >2000 mPa (cps) at 25 C. In another especially desired embodiment the catalyst composition comprises 60 to 90 wt % tertiary amine catalyst and 40 to 10 wt % MPD component when the tertiary amine catalyst is a liquid with viscosity <100 mPa (cps) at 25 C.

The MPD component comprises 20 to 100 wt % MPD and 80 to 0 wt % C7+alkanol or alkoxylated derivative thereof. The MPD component may comprise 45 to 90 wt % MPD and 55 to 10 wt % C7+alkanol or alkoxylated derivative thereof. In one aspect the alkanol contains 7 to 26 carbon atoms, preferably 8 to 18 carbons.

A catalytically effective amount of the catalyst composition comprising one or more tertiary amine gelling, blowing or urea catalysts in combination with the MPD component is used in the polyurethane formulation. More specifically, suitable amounts of the catalyst composition may range from about 0.01 to 10 parts by wt per 100 parts polyol (pphp) in the polyurethane formulation, preferably 0.05 to 2 pphp.

The catalyst composition may be used in combination with, or also comprise, other tertiary amine, organotin or carboxylate urethane catalysts well known in the urethane art.

EXAMPLE 1

In this example TDI polyurethane foams were prepared in a conventional manner. The polyurethane formulations in parts by weight were:

| Components | Foam 1 | Foam 2 |
|---|---|---|
| Specflex NC 630 Polyol | 72 | 72 |
| Specflex NC 700 Polyol | 28 | 28 |
| SSF | 0.8 | 0.8 |
| DEOA-LF | 1.76 | 1.5 |
| Added Water | 3.84 | 2.67 |
| TEDA | 0.11 | 0.11 |
| BDMAEE | 0.056 | 0.056 |
| Carrier | varied | varied |
| TDI | 48.15 | 35.98 |
| Index 100 | | |

Specflex NC 630 - a conventional, ethylene oxide tipped polyether polyol from Dow
Specflex NC 700 - a styrene-acrylonitrile copolymer filled polyether polyol from Dow
SSF - a 3:1 blend of Dabco ® DC 5169 and DC 5164 silcone surfactants from Air Products and Chemicals, Inc.
TDI - Mondur TD80 - a mixture of 80 wt % 2,4-TDI and 20 wt % 2,6-TDI
TEDA - Triethylenediamine
BDMAEE - Bis(dimethylaminoethyl) ether
DEOA-LF - 85 wt % Diethanolamine, 15 wt % water Table I lists the catalyst compositions and Table II lists the physical properties obtained using the catalysts in conjunction with carriers of this invention and a dipropylene glycol control, not of this invention. TEDA and BDMAEE catalysts were chosen to represent industry standard gelling and blowing catalysts respectively, thus bracketing the blow to gel selectivity range utilized in the foam industry [J. Cellular Plastics, Vol. 28, 1992, pp. 360-398].

Machine runs for the flexible molded foam were conducted on a Hi Tech Sure Shot MHR-50, cylinder displacement series and high-pressure machine. Fresh premixes, consisting of the appropriate polyols, water, crosslinker, surfactants and catalysts for each formulation were charged to the machine. Mondur TD-80 was used throughout the entire study. All chemical temperatures were held at 23±2° C. via the machine's internal temperature control units. Foam pours were made into an isothermally controlled, heated aluminum mold maintained at 63±2° C. The mold was a typical physical property tool designed with internal dimensions of 40.6 cm×40.6 cm×10.2 cm. The mold has five vents, each approximately 1.5 mm in diameter, centered in each corner 10.0 cm from each edge and the geometric center of the lid. The mold was sprayed with a solvent-based release agent, prior to every pour and allowed to dry for one minute before pouring. The foam premix was puddle poured into the center of the mold with a wet chemical charge weight capable of completely filling the mold and obtaining the desired core densities reported. Minimum fill requirements were established for each formulation evaluated. The foam article was demolded at 240 seconds (4 minutes) after the initial pour (detailed in next paragraph). Upon demold, the foam was placed through a mechanical crusher or tested for Force-to-Crush (FTC) measurements (detailed below).

All physical property foams in each catalyst set were mechanically crushed 1 minute after demold using a Black Brothers Roller crusher set to a gap of 2.54 cm. Crushing was conducted three times on each part, rotating the foam 90 degrees after each pass through the rollers. All parts produced for physical testing were allowed to condition for at least seven days in a constant temperature and humidity room (23±2° C., 50±2% relative humidity).

Three to four physical property parts were produced for any given set of conditions. Five test specimens were die-cut from each pad and evaluated for each physical property listed in Table II and III. All results were included in calculating averages. Each test was conducted as specified in ASTM D-3574.

FTC measurements were conducted 45 seconds after demold. The pad was removed from the mold, weighed and placed in the FTC apparatus. The force detection device is equipped with a 2.2 kg capacity pressure transducer mounted between the 323 $cm^2$ circular plate cross head and the drive shaft. The actual force is shown on a digital display. This device mimics the ASTM D-3574, Indentation Force Deflection Test and provides a numerical value of freshly demolded foam's initial hardness or softness. The pad was compressed to 50 percent of its original thickness at a cross-head velocity of 275 mm per minute with the force necessary to achieve the highest compression cycle recorded in Newtons. Ten compression cycles were completed. A cycle takes approximately 30 seconds to complete.

TABLE I

| Catalyst | Components | Use Level* (pphp) | Carrier[a] |
|---|---|---|---|
| Control | 33LV/BL-11 | 0.32/0.08 | DPG control |
| 1 | TEDA + carrier/ BDMAEE + carrier | 0.32/0.08 | MPD |
| 2 | TEDA + carrier/ BDMAEE + carrier | 0.32/0.08 | 75 wt % MPD/ 25 wt % 2-ethyl-1-hexanol |

[a]The carriers are added to TEDA (33 wt % TEDA, 67 wt % carrier) and BDMAEE (70 wt % BDMAEE, 30 wt % carrier) at the same levels as those of the DPG control in the commercial 33LV and BL-11 products to facilitate direct comparison. Disregarding the carriers, the active amounts of the TEDA (0.107 pphp) and BDMAEE (0.056 pphp) catalysts are the same in each catalyst composition.

TABLE II

| | Foam 1 | | | Foam 2 | | |
|---|---|---|---|---|---|---|
| | Control | Catalyst 1 | Catalyst 2 | Control | Catalyst 1 | Catalyst 2 |
| pphp | 0.32/0.08 | 0.32/0.08 | 0.32/0.08 | 0.32/0.08 | 0.32/0.08 | 0.32/0.08 |
| Density (kg/m3) | 29.55 (.67) | 29.05 (.33) | 28.63 (.46) | 41.87 (2.09) | 42.91 (.31) | 42.61 (.75) |
| Airflow (SCFM) | 2.01 (.04) | 2.26 (.12) | 2.37 (.12) | 1.79 (0.11) | 2.15 (.40) | 2.93 (.42) |
| Force to Crush (lbs) demold + 45 sec | | | | | | |
| 1st | 240 | 224 | 225 | 353 | 322 | 371 |
| 2nd | 166 | 146 | 148 | 243 | 216 | 253 |
| 3rd | 119 | 106 | 108 | 157 | 144 | 165 |
| 4th | 88 | 77 | 75 | 115 | 100 | 110 |
| 5th | 69 | 58 | 61 | 86 | 79 | 84 |
| 10th | 25 | 27 | 27 | 41 | 36 | 36 |
| Tensile (kN/m2) | 138.06 | 121.64 | 134 | 155.31 | 155.05 | 155.89 |
| Tear (N/m) | 195.61 | 200.95 | 203.26 | 237.54 | 245.51 | 263.39 |
| Elongation (%) | 108.23 | 100.66 | 107.05 | 128.29 | 126.3 | 128.48 |

TABLE II-continued

|  | Foam 1 | | | Foam 2 | | |
|---|---|---|---|---|---|---|
|  | Control | Catalyst 1 | Catalyst 2 | Control | Catalyst 1 | Catalyst 2 |
| 25% ILD (lbf; N) | 100.87 | 103.87 | 107.85 | 186.61 | 185.34 | 172.15 |
| 65% ILD (lbf; N) | 294.49 | 314.37 | 320.11 | 509.89 | 495.06 | 471.28 |
| 25% R ILD (lbf; N) | 84.7 | 86.67 | 89.12 | 164.14 | 163.37 | 151.84 |
| Support Factor | 2.92 | 3.03 | 2.97 | 2.73 | 2.67 | 2.74 |
| Japanese Wet Set, % | 26.55 (1.18) | 25.4 (.76) | 26.99 (.87) | 9.95 (.20) | 11.08 (54) | 11.72 (61) |
| 50% Compression Set | 8.08 (.26) | 6.52 (.56) | 6.89 (.22) | 7.02 (.62) | 7.26 (.79) | 6.24 (1.08) |

The data in Table II demonstrate that using Catalysts 1 or 2 provided higher airflow and lower force to crush than when compared to the Catalyst control having DPG carrier in making TDI foams. In most cases the force to crush is lower on the first cycle and becomes lower than the control no later than the fourth cycle. It is also known to be difficult to improve tear strength without significant deterioration in resilience. Catalysts 1 and 2 provided up to 10% improvement in tear with no more than 5% loss in resilience, without significantly altering other important physical properties.

EXAMPLE 2

In this example MDI polyurethane foams were prepared in a conventional manner. Table I lists the catalyst compositions and Table III lists the physical properties obtained using the catalysts from Table I in conjunction with carriers of this invention and adipropylene glycol control, not of this invention. The polyurethane formulations in parts by weight were:

| Components | Foam 3 |
|---|---|
| Voranol 6001 Polyol | 100 |
| CP-1421 Cell Opener | 1.3 |
| SSF | 1 |
| DEOA-LF | 0.71 |
| Added Water | 3.49 |
| TEDA | 0.11 |
| BDMAEE | 0.056 |
| Carrier | varied |
| MDI (Index 100) | 60.6 |

Voranol 6001 - a conventional, ethylene oxide tipped polyether polyol from Bayer
CP-1421 Cell Opener - a high ethylene oxide content polyether polyol from Dow
SSF - Dabco ® DC 2525 silicone surfactant from Air Products and Chemicals, Inc.
MDI - Rubinate 7304 (32.4% NCO)

TABLE III

|  | Foam 3 | | |
|---|---|---|---|
|  | Control | Catalyst 1 | Catalyst 2 |
| pphp | 0.32/0.08 | 0.32/0.08 | 0.32/0.08 |
| Density (kg/m3) | 50.92 (.57) | 50.60 (1.16) | 50.12 (.87) |
| Airflow (SCFM) | 2.55 (.24) | 2.09 (.25) | 2.90 (.20) |
| Force to Crush (lbs) demold + 45 sec |  |  |  |
| 1st | 65 | 60 | 59 |
| 2nd | 62 | 58 | 56 |
| 3rd | 63 | 58 | 56 |
| 4th | 64 | 59 | 57 |
| 5th | 66 | 61 | 58 |
| 10th | 68 | 62 | 60 |
| Tensile (kN/m2) | 176.88 | 165.88 | 169.47 |
| Tear (N/m) | 311.41 | 325.71 | 339.08 |
| Elongation (%) | 112.48 | 112.43 | 112.75 |

TABLE III-continued

|  | Foam 3 | | |
|---|---|---|---|
|  | Control | Catalyst 1 | Catalyst 2 |
| 25% ILD (lbf; N) | 341.24 | 339.63 | 332.38 |
| 65% ILD (lbf; N) | 956.93 | 928.33 | 954.01 |
| 25% R ILD (lbf; N) | 265.52 | 266.27 | 257.24 |
| Support Factor | 2.8 | 2.73 | 2.87 |
| Japanese Wet Set, % | 10.52 (.34) | 10.74 .20) | 12.05 (.08) |
| 50% Compression Set | 7.65 (.46) | 6.71 (.31) | 6.70 (.49) |

The data in Table III demonstrate that using Catalysts 1 or 2 provided higher airflow and/or lower force to crush than when compared to the Catalyst control DPG carrier/diluent in making MDI foams. In both cases the force to crush is lower on the first cycle. Catalysts 1 and 2 provided up to 9% improvement in tear with no more than 3% loss in resilience, without significantly altering other important physical properties.

Unexpectedly, Tables II and III demonstrate that foam physical properties can be systematically varied by choosing tertiary amine catalysts in combination with MPD and optionally alkanols including 2-ethyl-1-hexanol. Specifically, physical properties which can be significantly altered are force-to-crush, airflow and tears.

We claim:

1. A method for making a flexible polyurethane foam which comprises contacting a polyisocyanate, with a formulation consisting essentially of:

| Formulation | pbw |
|---|---|
| Polyol | 20-100 |
| Silicone Surfactant | 0.3-3 |
| water | 1-6 |
| Catalyst Composition | 0.2-2 | and at least one polymer polyol; at least one diluent selected from the group consisting of dipropylene glycol, ethylene glycol and diethylene glycol; and at least one cross-linker selected from the group consisting of diethanolamine, diisopropanolamine, triethanolamine and tripropanolamine; wherein the catalyst composition is 2-methyl-1,3-propanediol and one or more tertiary amine urethane catalysts wherein the amount of 2-methyl-1,3-propanediol is sufficient to achieve a catalyst composition viscosity of 100 to 2000mPa and wherein the polyol includes at least one of polyether and polyester polyols and wherein the polyisocyanate and polyol are provided in amounts such that the isocyanate index is in the range of 70 to 115.

2. The method of claim 1 in which the one or more tertiary amine urethane catalysts are selected from triethylenediamine; 1,8-diaza-bicyclo(5.4.0)undecene-7; quinuclidine; substituted quinuclidines; substituted pyrrolizidines; substituted pyrrolidines; pentamethyldipropylenetriamine; tris(3-dimethylaminopropyl)amine; dimethylcyclohexyl-amine; methyldicyclohexylamine; N,N-dimethylethanolamine; N-alkyl morpholines; dimethylaminopropylamine; N,N,N",N"'-tetramethyldipropylene-triamine; N,N-bis-(3-dimethyl-aminopropyl)-N-isopropanolamine; N-(3-dimethylamino-propyl)-N,N-diisopropanolamine; 2-(2-dimethylaminoethoxy)ethanol;2-[N-(dimethyl-aminoethyl)-N-methylamino]ethanol; trimethylamine;triethylamine; tributylamine; trioctylamine; diethyl cyclohexylamine; N-methyl-morpholine; N-ethylmorpholine; N-octadecyl-morpholine (N-cocomorpholine); N-methyl-diethanolamine; N,N-dimethyl-ethanolamine; N,N'-bis(2-hydroxypropyl)piperazine;N,N,N',N'-tetramethylethylenediamine; N,N,N', N'-tetramethyl-1,3-propanediamine; 1,4-bis(2-hydroxypropyl)-2-methylpiperazine; N,N-dimethylbenzylamine; N,N-diethylbenzylamine; N-ethyl-hexamethyleneamine; N-ethylpiperidine; alpha-methyl-benzyldimethylamine; dimethylhexadecylamine; dimethylcetylamine; bisdimethylaminoethyl ether; pentamethyldiethylenetriamine; permethylated polyamines; branched polyamines; 2-[N-(dimethylaminoethoxyethyl)-N-methylamino]ethanol; alkoxylated polyamines; imidazole-borons; aminopropyl-bis(amino-ethyl)ethers; 2-dimethylaminoethyl urea; N,N'-bis(2-dimethylaminoethyl) urea; N,N-bis(2-dimethylaminoethyl) urea; 3-dimethyl-aminopropyl urea; N,N'-bis(3-dimethyl-aminopropyl) urea; N,N-bis(3-dimethylamino-propyl) urea; 1-(N-methyl-3-pyrrolidino)-methyl urea; 1,3-bis(N-methyl-3-pyrrolidino)-methyl urea; 3-piperidinopropyl urea; N,N'-bis(3-piperidinopropyl) urea; 2-piperidinoethyl urea; N,N'-bis(2-piperidinoethyl) urea and mixtures thereof.

3. The method of claim 1 in which the one or more tertiary amine urethane catalysts are selected from triethylenediamine; pentamethyldipropylenetriamine; bisdimethylaminoethyl ether; pentamethyldiethylenetriamine; 3-dimethyl-aminopropyl urea, N,N'-bis(3-dimethyl-aminopropyl) urea, 1-(N-methyl-3-pyrrolidino)methyl urea, 1,3-bis(N-methyl-3-pyrrolidino)methyl urea, and mixtures thereof.

4. The method of claim 1 in which the one or more tertiary amine urethane catalysts are selected from the group consisting of triethylenediamine, bisdimethylaminoethyl ether, or a mixture thereof.

5. The method of claim 1 in which the catalyst composition is 10 to 90wt % one or more tertiary amine catalysts and 90 to 10 wt % 2-methyl-1,3-propanediol component.

6. The method of claim 1 in which the catalyst composition is 25 to 80 wt % tertiary amine catalyst and 75 to 20 wt % 2-methyl-1,3-propanediol.

7. The method of claim 1 in which the catalyst composition is 60 to 90 wt % tertiary amine catalyst and 30 to 10 wt % 2-methyl-1,3-propanediol.

8. The method of claim 1 wherein the relative amounts of the components in the formulation produce a flexible polyurethane foam of 16 to 65 kg/m$^3$ density, and a tear strength greater than 200 N/m.

9. The method of claim 1 wherein the formulation includes an auxiliary blowing agent.

10. The method of claim 1 wherein the foam also has a Support Factor of about 2.67 as determined by ASTM D-3574 after conditioning for at least seven days at about 23° C. and 50% relative humidity.

11. The method of claim 8 wherein the foam has a Support Factor of about 2.67 as determined by ASTM D-3574 after conditioning for at least seven days at about 23° C. and 50% relative humidity.

12. The method of claim 8 wherein the foam has a Support Factor of about 3.03 as determined by ASTM D-3574 after conditioning for at least seven days at about 23° C. and 50% relative humidity.

13. The method of claim 1 wherein the polyisocyanate comprises toluene diisocyanate.

14. The method of claim 1 wherein the polyisocyanate comprises 4,4'-diphenylmethane diisocyanate.

15. The method of claim 1 wherein the flexible polyurethane foam has a 16 to 65 kg/m$^3$ density, a tear strength greater than 200N/m and a percent elongation of less than 128%.

16. The method of claim 1 wherein the formulation includes at least one cell stabilizer.

17. The method of claim 4 wherein the one or more tertiary amine urethane catalysts comprises triethylenediamine.

18. The method of claim 1 wherein the amount of 2-methyl-1,3-propanediol is sufficient to increase air flow in the foam.

19. The method of claim 4 wherein the one or more tertiary amine urethane catalyst comprises bisdimethylaminoethyl ether.

20. The method of claim 1 wherein the catalyst composition consists essentially of 2 methyl-1,3-propanediol, triethylenediamine and dimethylaminopropylamine.

21. The method of claim 1 wherein the one or more tertiary amine urethane catalysts are blocked with a carboxylic acid, a phenol or a substituted phenol.

22. The method of claim 1 wherein the polyol consists essentially of polyether polyols.

23. A method for making a polyurethane foam comprising:
preparing a catalyst consisting essentially of at least one diluent selected from the group consisting of dipropylene glycol, ethylene glycol and diethylene glycol, at least one tertiary amine catalyst and 2-methyl-1,3-propanediol wherein the catalyst composition has a viscosity of 100-2000 mPa,
preparing a pre-mix comprising the catalyst composition, at least one polyether polyol, water and at least one silicone surfactant,
contacting the pre-mix with at least one isocyanate under conditions sufficient to produce the foam.

24. The method of claim 23 wherein the at least one diluent comprises dipropylene glycol.

25. A method for making a molded polyurethane foam comprising:
preparing a catalyst composition consisting essentially of at least one diluent selected from the group consisting of dipropylene glycol, ethylene glycol and diethylene glycol, at least one tertiary amine catalyst and 2-methyl-1,3-propanediol wherein the catalyst composition has a viscosity of 100-2000 mPa,
preparing a pre-mix comprising the catalyst composition, at least one polyol, and water,
contacting the pre-mix with at least one isocyanate in a mold under conditions sufficient to produce the foam in the mold.

26. The method of claim 25 wherein the at least one tertiary amine catalyst comprises bisdimethylaminoethyl ether and triethylenediamine.

* * * * *